US011386178B2

(12) United States Patent
Garrity et al.

(10) Patent No.: US 11,386,178 B2
(45) Date of Patent: Jul. 12, 2022

(54) ENHANCED NOTIFICATION SYSTEM FOR REAL TIME CONTROL CENTER

(71) Applicant: Sprinklr, Inc., New York, NY (US)

(72) Inventors: Justin Trevor Garrity, Portland, OR (US); Dan Blaisdell, Hillsboro, OR (US); Ryan Robert Parr, North Plains, OR (US)

(73) Assignee: SPRINKLR, INC., New York, NY (US)

( * ) Notice: Subject to any disclaimer, the term of this patent is extended or adjusted under 35 U.S.C. 154(b) by 273 days.

(21) Appl. No.: 16/447,138

(22) Filed: Jun. 20, 2019

(65) Prior Publication Data
US 2020/0401640 A1 Dec. 24, 2020

(51) Int. Cl.
*G06F 16/00* (2019.01)
*G06F 16/9536* (2019.01)
*G06F 16/9538* (2019.01)
*G08B 3/10* (2006.01)
*G08B 5/36* (2006.01)
*G06Q 30/02* (2012.01)

(52) U.S. Cl.
CPC ...... *G06F 16/9536* (2019.01); *G06F 16/9538* (2019.01); *G06Q 30/0201* (2013.01); *G08B 3/10* (2013.01); *G08B 5/36* (2013.01)

(58) Field of Classification Search
CPC ... G06F 16/9536; G06F 16/9538; G08B 3/10; G08B 5/36; G06Q 30/0201
See application file for complete search history.

(56) References Cited

U.S. PATENT DOCUMENTS

| 7,406,436 | B1 | 7/2008 | Reisman |
| 8,655,938 | B1 | 2/2014 | Smith |
| 8,972,275 | B2 | 3/2015 | Park et al. |
| 9,201,955 | B1 | 12/2015 | Quintao |

(Continued)

FOREIGN PATENT DOCUMENTS

WO 2016/118425 7/2016

OTHER PUBLICATIONS

Hye-Jin Paek et al., "A Multimethod Approach to Evaluating Social Media Campaign Effectiveness", pp. 1570-1579 (Year: 2013).*

(Continued)

*Primary Examiner* — Jared M Bibbee
(74) *Attorney, Agent, or Firm* — Schwabe Williamson & Wyatt

(57) ABSTRACT

A control center includes a display screen for displaying different social media and social media analytics. The control center includes an enhanced notification device that operates independently and remotely from the display screen. A media controller receives a selection of a search term, selection of an analytic, and selection of a trigger event for the analytic. The control center obtains social media from different networks containing the search term and generates the selected analytic from the social media. The media controller activates the enhanced notification device when the trigger event is detected in the analytic. The activated notification device provides a different environmental attribute than the display screen that is more effective in gaining the attention of the control center operators.

20 Claims, 6 Drawing Sheets

(56) References Cited

U.S. PATENT DOCUMENTS

| | | | |
|---|---|---|---|
| 9,218,610 B2 | 12/2015 | Kandregula | |
| 9,734,514 B2 | 8/2017 | Heffernan | |
| 10,467,630 B2 | 11/2019 | Iyer et al. | |
| 10,535,029 B2* | 1/2020 | Garrity | G06F 3/04842 |
| 10,684,738 B1 | 6/2020 | Sicora | |
| 10,769,223 B1* | 9/2020 | Patel | G06F 16/9535 |
| 2001/0028369 A1 | 10/2001 | Gallo | |
| 2003/0187956 A1 | 10/2003 | Belt | |
| 2003/0220835 A1 | 11/2003 | Barnes, Jr. | |
| 2004/0054819 A1 | 3/2004 | Daimoto et al. | |
| 2005/0050021 A1 | 3/2005 | Timmons | |
| 2005/0131909 A1 | 6/2005 | Cavagnaro et al. | |
| 2006/0184963 A1 | 8/2006 | Snijder | |
| 2007/0103583 A1 | 5/2007 | Burnett | |
| 2008/0284910 A1 | 11/2008 | Erskine | |
| 2010/0119053 A1 | 5/2010 | Goeldi | |
| 2010/0153377 A1 | 6/2010 | Rajan et al. | |
| 2010/0185630 A1 | 7/2010 | Cheng et al. | |
| 2011/0004827 A1 | 1/2011 | Doerr | |
| 2011/0098108 A1 | 4/2011 | Kuper | |
| 2011/0122155 A1 | 5/2011 | Zechlin | |
| 2011/0255748 A1 | 10/2011 | Komoto | |
| 2011/0307312 A1* | 12/2011 | Goeldi | G06Q 30/0251 |
| | | | 705/14.6 |
| 2011/0320948 A1 | 12/2011 | Choi | |
| 2012/0110427 A1 | 5/2012 | Krause | |
| 2012/0134536 A1 | 5/2012 | Kan | |
| 2012/0291059 A1 | 11/2012 | Roberts | |
| 2013/0014137 A1* | 1/2013 | Bhatia | G06Q 30/0201 |
| | | | 725/9 |
| 2013/0124653 A1* | 5/2013 | Vick | H04L 51/32 |
| | | | 709/206 |
| 2013/0166379 A1 | 6/2013 | Ehindero | |
| 2013/0297581 A1 | 11/2013 | Ghosh | |
| 2013/0297694 A1 | 11/2013 | Ghosh | |
| 2014/0040029 A1 | 2/2014 | Vhora | |
| 2014/0143333 A1* | 5/2014 | Dodge | G06Q 50/01 |
| | | | 709/204 |
| 2014/0156341 A1 | 6/2014 | Kruk | |
| 2014/0172744 A1 | 6/2014 | El-Hmayssi | |
| 2014/0180788 A1* | 6/2014 | George | G06Q 30/0277 |
| | | | 705/14.41 |
| 2014/0214819 A1* | 7/2014 | Aitchison | G06F 16/29 |
| | | | 707/724 |
| 2014/0222578 A1 | 8/2014 | Poornachandran | |
| 2014/0232616 A1 | 8/2014 | Drake | |
| 2014/0280052 A1 | 9/2014 | Alonzo et al. | |
| 2014/0358630 A1* | 12/2014 | Bhagat | G06Q 30/0201 |
| | | | 705/7.29 |
| 2014/0361954 A1 | 12/2014 | Epstein | |
| 2015/0012353 A1* | 1/2015 | Ciancio-Bunch | |
| | | | G06Q 30/0269 |
| | | | 705/14.49 |
| 2015/0019335 A1 | 1/2015 | Zhou | |
| 2015/0031389 A1 | 1/2015 | Liu | |
| 2015/0046269 A1 | 2/2015 | Liu | |
| 2015/0046781 A1 | 2/2015 | Baker | |
| 2015/0067075 A1 | 3/2015 | Sheppard et al. | |
| 2015/0088622 A1 | 3/2015 | Ganschow | |
| 2015/0089429 A1 | 3/2015 | Ghassabian | |
| 2015/0100377 A1* | 4/2015 | Penumaka | G06Q 50/01 |
| | | | 705/7.29 |
| 2015/0112814 A1 | 4/2015 | Stokes | |
| 2015/0113018 A1* | 4/2015 | Steed | G06F 16/2465 |
| | | | 707/776 |
| 2015/0161633 A1 | 6/2015 | Adams | |
| 2015/0163311 A1* | 6/2015 | Heath | G06Q 30/0236 |
| | | | 709/204 |
| 2015/0186929 A1* | 7/2015 | Thies | G06Q 30/0267 |
| | | | 705/14.45 |
| 2015/0187333 A1 | 7/2015 | Loeffler | |
| 2015/0213119 A1 | 7/2015 | Agarwal | |
| 2015/0235239 A1 | 8/2015 | Chowdhary | |
| 2015/0279037 A1 | 10/2015 | Griffin | |
| 2016/0019397 A1* | 1/2016 | Peterson | G06F 16/955 |
| | | | 726/28 |
| 2016/0088362 A1 | 3/2016 | Kaneko et al. | |
| 2016/0092499 A1 | 3/2016 | Leigh et al. | |
| 2016/0140627 A1 | 5/2016 | Moreau | |
| 2016/0155389 A1 | 6/2016 | Beon | |
| 2016/0188661 A1 | 6/2016 | Huang et al. | |
| 2016/0217408 A1* | 7/2016 | Garrity | G06Q 10/063 |
| 2016/0225017 A1 | 8/2016 | Wong | |
| 2016/0321696 A1* | 11/2016 | Murthy | G06Q 30/0257 |
| 2016/0343040 A1* | 11/2016 | Garrity | G06Q 50/01 |
| 2017/0010756 A1 | 1/2017 | Liensberger et al. | |
| 2017/0061469 A1* | 3/2017 | Garrity | G06Q 50/01 |
| 2017/0084246 A1 | 3/2017 | Joshi | |
| 2017/0206557 A1* | 7/2017 | Abrol | G06Q 30/0269 |
| 2017/0357217 A1* | 12/2017 | Raymann | G06F 3/04847 |
| 2017/0372429 A1* | 12/2017 | La Placa | G06N 5/02 |
| 2018/0024712 A1* | 1/2018 | Sievers | G06F 3/0481 |
| | | | 715/738 |
| 2018/0260185 A1 | 9/2018 | Garrity | |
| 2019/0026786 A1* | 1/2019 | Khoury | G06Q 30/0271 |
| 2019/0026788 A1 | 1/2019 | Garrity | |
| 2019/0065610 A1* | 2/2019 | Singh | H04L 51/32 |
| 2019/0087874 A1 | 3/2019 | DeLuca | |
| 2019/0094027 A1 | 3/2019 | Xu | |
| 2019/0102075 A1 | 4/2019 | Naidoo | |
| 2019/0173826 A1* | 6/2019 | DeLuca | H04L 51/32 |
| 2019/0205839 A1 | 7/2019 | Dotan-Cohen | |
| 2019/0206231 A1* | 7/2019 | Armstrong | H04W 4/029 |
| 2019/0230473 A1* | 7/2019 | Raji | G01S 5/00 |
| 2019/0265942 A1 | 8/2019 | Yoshimura | |
| 2019/0333118 A1 | 10/2019 | Crimmons | |
| 2020/0177722 A1* | 6/2020 | Janugani | H04N 21/478 |
| 2020/0226526 A1 | 7/2020 | Garrity | |
| 2020/0250395 A1 | 8/2020 | Ross | |
| 2020/0273063 A1 | 8/2020 | Garrity et al. | |
| 2020/0293258 A1 | 9/2020 | Lin | |
| 2020/0387411 A1* | 12/2020 | Chu | G06F 16/5866 |
| 2021/0295233 A1 | 9/2021 | Garrity et al. | |

OTHER PUBLICATIONS

Gruhl, et al., "Multimodal social intelligence in a real-time dashboard system", VLDB Journal 19.6: 825-848; Springer New York; Jan. 1, 2010.

Guille et al. "SONDY: An open source platform for social dynamics mining and analysis" Proceedings of the ACM SIGMOD International Conference on Management of Data: 1005-1008. Association for Computing Machinery. (Jul. 30, 2013).

Henderson, Harry: "Encyclopedia of Computer Science and Technology" Nov. 1, 2008, Facts on File; 580 pages.

International Search Report and Written Opinion from the International Searching Authority for PCT/US2016/013680 dated Mar. 22, 2016; 12 pages.

Psaltis, Andrew G.; "Streaming Data Designing the Real-Time Pipeline" Jan. 16, 2015, Manning Publications; 12 pages.

Tanenbaum, Andrew S., et al.; "Distributed Systems: Principles and Paradigms (2nd Edition)" Prentice Hall; Oct. 12, 2006; 68 pages.

Trendsmap Announces First Real-Time Geographic Visualization for Twitter Trends Tracking Business Wire Sep. 22, 2009: NA.

Wikipedia: "Server (computing)", Internet Article Jan. 19, 2015; retrieved from the internet <URL: https://en.wikipedia.org/w/index.php?title=Server_(computing)&oldid=643171056> retrieved on Mar. 14, 2016; 7 pages.

McIntyre et al., Support for Multitaking and Background Awareness Using Interactive Peripheral Displays, ACM 2001, pp. 41-50 (2001).

Krishnaprasad et al., "JuxtaView—A Tool for Interactive Visualization of Large Imagery on Scalable Tiled Displays", IEEE 2004, pp. 411-420 (2004).

Yamaoka et al., Visualization of High-Resolution Image Collections on Large Tiled Display Wall, Elsevier 2011, pp. 498-505 (2011).

* cited by examiner

ENHANCED NOTIFICATION SYSTEM FOR REAL TIME CONTROL CENTER

BACKGROUND

A real time control center may display different social media and social media analytics associated with a campaign. For example, a company may launch a campaign for a new soft drink. Company employees can use the real time control center to view user responses to the campaign. For example, the social media center may display messages posted by users liking or disliking the soft drink associated with the campaign. The control center also may display analytics that identify the number of likes, dislikes, sentiment, posts, reposts, etc. for the campaign related social media.

Large campaigns may produce millions of social media messages. The analytics generated from these messages may continuously change. Company employees may monitor the displayed analytics to determine the success of the campaign and to head off any problems with the campaign. For example, the company may need to quickly respond to a negative post from the influencer to reduce further negative effects to the social media campaign, such as preventing other users from reposting the influencer comments. Quickly responding to certain social media analytics may be critical to the success of a social media campaign.

It may be difficult for company employees to detect and quickly respond to critical events in the social media. For example, the company employee may have to sit at a desk for hours viewing the campaign social media or may have to monitor the campaign social media while performing other work assignments on a computer. The company employee may easily miss a spike or significant event in the social media that indicates a possible campaign problem.

DETAILED DESCRIPTION

Figure 1:
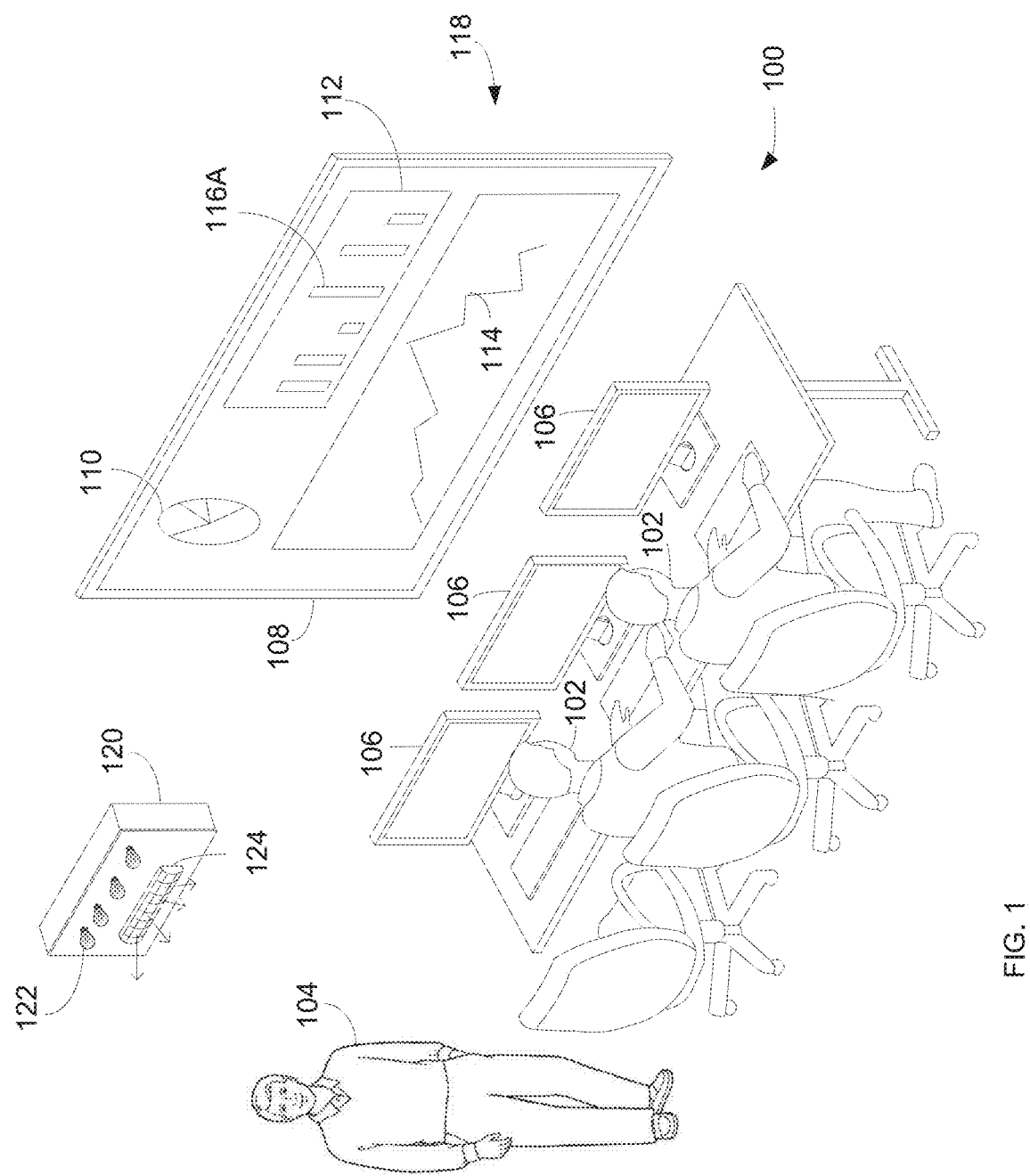
FIG. 1 shows an example real time control center with an enhanced notification device.

FIG. 1 shows a real time control center 100 that includes one of more display screens 108 that display social media and associated analytics. For example, a first pie chart 110 may display the number of male and female followers 110 for a social media campaign. A bar chart may identify the number of posted messages 112 associated with the campaign over time. A graph may identify user sentiment 114 associated with the campaign over time.

Of course, these are only examples, and any social media and associated analytics may be displayed on screen 108. For example, control center 100 also may display posts from the most influential followers, or may display any other demographics associated with the social media. Any posted messages, likes, dislikes, followers, sentiment, or any analytics generated from the posted messages and/or user feedback is referred to generally below as analytics 118.

Different operators 102 may view display screen 108 to monitor the status of a campaign. Operators 102 may use computers 106 to select different social media analytics 118 for displaying on display screen 108. Operators 102 may constantly monitor analytics 118 for any positive or negative events. For example, a large increase in the number of followers 110 may indicate a significant event. A similar increase in sentiment 114 may indicate a positive event and a decrease in sentiment 114 may indicate a negative event.

Operators 102 can search through other analytics 118 to further discover what caused the social media event. For example, an influencer may have posted a negative review of the campaign product that both increased the number of posted messages 112 and reduced sentiment 114. In another example, a large number of users may have posted a video of a sporting event that increased the number of posted messages 112 and also increased the posted message sentiment 114.

Operators 102 may need to respond to certain events. For example, operators 102 can post a reply to a negative review by an influencer to try and improve a trending negative sentiment or the operators 102 can repost the sporting event video to try and further boost a trending positive sentiment.

As also mentioned above, trends in analytics 118 may change quickly. If operators 102 do not respond quickly, negative events can quickly escalate and positive events can quickly deescalate. As also explained above, due to all of the analytics 118 displayed on screen 108, operators 102 may not notice, and therefore may not timely respond to, important events in analytics 118.

Control center 100 uses an enhanced notification device 120 to more effectively notify operators 102 of significant social media events. Notification device 120 may include any combination of visual and audio indicators. For example, notification device 120 may include a set of variable colored programmable lights 122. Notification device 120 also may include a programmable speaker 124.

Example enhanced notification devices 120 may include a smart lighting device, such as a Hue lighting device made by Philips, The Netherlands. Enhanced notification device 120 also may include a smart audio device, such as Amazon Alexa made by Amazon.com, Inc., Seattle, Wash.

Operators 102 may program control center 100 to activate notification device 120 when certain selectable trigger events are detected in analytics 118. For example, control center 100 may be programmed to activate notification device 120 when the number of followers 110, posted messages 112, or sentiment 114 reach certain thresholds.

Notification device 120 provides a new environmental attribute by operating independently and in a different location from display screen 108. Notification device 120 provides an immediate heightened awareness to operators 102 of selectable social media events. Operators 102 are then more responsive to these social media events 112 and can more effectively multi-task without having to continuously view display screen 108.

Notification device 120 also provides a quick status indication of the social media campaign. For example, a supervisor 104 may walk into the room where control center 100 is located. Supervisor 104 can simply look at notification device 120 to determine if any significant events are occurring in analytics 118. For example, a red flashing light on notification device 120 may quickly notify supervisor 104 of a significant negative event occurring in the campaign. A green flashing light on notification device 120 may notify supervisor 104 of a significant positive event occurring in the campaign. No flashing lights on notification device 120 may quickly notify supervisor 104 that no significant events are occurring in the campaign.

The different visual devices 122 and audio devices 124 can provide different levels of information or criticality regarding the campaign. For example, an activated red light 122 may indicate a negative event and an activated green light 122 may indicate a positive event. Similarly, a first tone generated by speaker 124, such as a low frequency tone, may indicate a negative event and a higher more pleasant tone may indicate a positive event.

Other light positions or audio tones may correspond with different events. For example, a first light 122 may be programmed to activate when a number of followers reaches a selected threshold and a second light 122 may be programmed to activate when the number of likes reaches a selected threshold. The first and second lights 122 also may be programmed to start flashing when the number of followers and the number of likes reach second higher or lower selectable thresholds.

Similarly, speaker 124 may be programmed to output a first tone based on the number of followers and output a second tone based on the number of likes. Of course notification device 120 may be programmed to output any visual or audio output for any selectable social media analytic.

Figure 2:
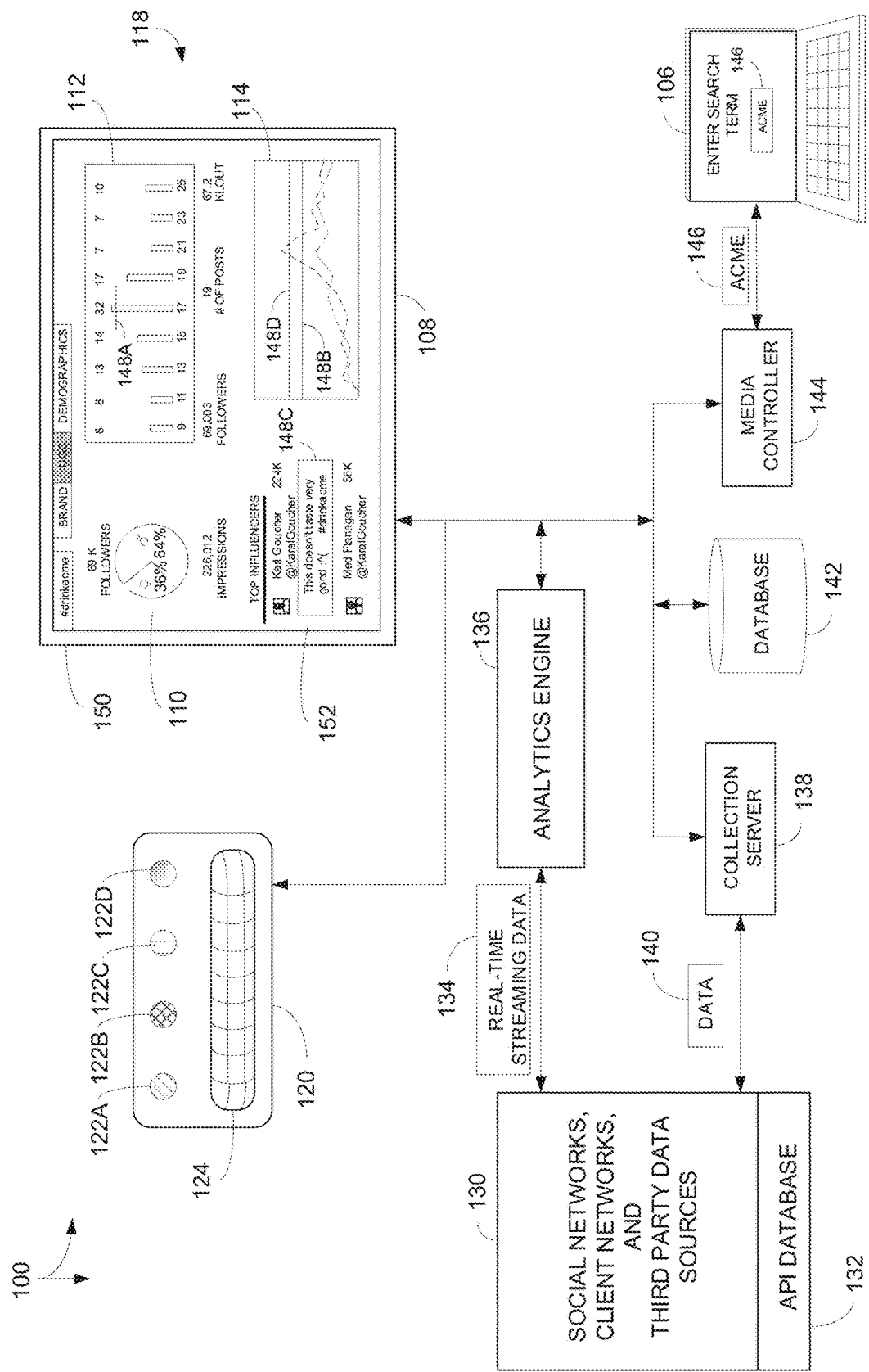
FIG. 2 shows the real time control center of FIG. 1 in more detail.

FIG. 2 shows control center 100 in more detail. Display screen 108 may comprise any type of display device, such as light emitting diodes (LEDs), liquid crystal display (LCD), or any other type of screen or display device. Computer 106 may include a personal computer (PC), laptop, tablet, smart phone, smart watch, or any other computing device.

Control center 100 may access different data sources 130, such as social networks, client networks, or any other source of social media content or analytic data. Social networks 130 may include social media websites, such as Twitter®, Facebook®, Instagram®, or the like. Client networks 130 may include websites for a company, individual, or any other entity associated with social media. For example, client networks 130 may include the www.acme.com website and other Acme company databases.

Third party data sources 130 may include websites such as Adobe® or Google® analytics that monitor, measure, and/or generate analytics for social media, data sources, websites, etc. Another example third party data source 130 may include customized databases, such as created by Salesforce®, Salesforce® Radian6, or Sysomos® that provide access to marketing and sales data.

Some data sources 130 may provide content, such as posted messages, and other data sources 130 may provide more numerical data such as, analytic data, company sales data, inventory data, financial data, spreadsheet data, website ecommerce data, wrist band radio frequency identification (RFID) reader data, number web page views, number of unique page views, time on web pages, starting web page, bounce rates, percentage of exists from web pages, impressions, Klout, or any other analytic data that may be relevant to a social media campaign.

An analytics engine 136 and a collection server 138 may use database application programmer interfaces (APIs) 132 to access data from data sources 130. For example, analytics engine 136 may use APIs 132 to extract real-time streaming data 134 from data sources 130. Collection server 138 also may use APIs 132 to extract and store data 140 from data sources 130 in a database 142. Streaming data 134 may be similar to data 140 and may include real-time updates to data 140 already stored in database 142.

A user may enter a search term 146 into computer 106. For example, the user may enter any keyword, data string, term, value, or any other combination of characters into computer 106. In one example, search term 146 may include the name of company or person, a name of a product or service, a brand name, a name of a campaign or event associated with a company or person, a name of a department within a company, a name of an account on a social website, a name of a subject or account, a hashtag name associated with the person or company, a name of a competitor or competitive product, or the name of any other service, item, topic, data category, content, event, or any other entity identifier.

A media controller 144 directs collection server 138 and/or analytics engine 136 to identify and extract data from data sources 130 associated with search term 146. For example, media controller 144 may direct collection server 138 and/or analytics engine 136 to search for different social media accounts on the www.acme.com website and extract or scan data for different products or services sold on the www.acme.com website.

Collection server 138 may download links to the social media accounts and product information into database 142. Media controller 144 then may direct collection server 138 to download content from the social media accounts identified on the Acme website. For example, collection server 138 may download or scan posted messages from the www.facebook.com/acme social media account into database 142. Alternatively, a user may enter the social media account directly into computer 106 as search term 146.

Media controller 144 and/or analytics engine 136 then may identify campaigns launched by Acme based on the hashtags in the posted messages. For example, analytics engine 136 may count the number of times the same hashtag or keyword is used in different posted messages. Analytics engine 136 may identify any hashtag or keyword used more than some threshold number of times in Acme posted messages as associated with a campaign.

Media controller 144 then may cause collection server 138 to download messages posted by the Acme account or posted by Acme account participants that include the identified campaign hashtag. Collection server 138 may download any other analytics associated with the downloaded messages, such as participant influencer data. Analytics engine 134 then may start downloading real-time streaming data 134 from data sources 130 that include, or are associated with, the identified campaign hashtag.

Analytics engine 136 may group together content based on the identified campaign. For example, an identified campaign may include all of the messages posted by the Acme account that include the identified campaign hashtag and include all of the messages posted by participants underneath the Acme posted messages, such as posted messages, replies, comments, etc. The campaign data may include any other data associated with the campaign hashtag.

Control center 100 may generate and display content and analytics related to the campaign on display screen 108. For example, control center 100 may display a menu 150 that identifies the selected campaign, such as #drinkacme. An operator may select brand analytics, user generated content (UGC) analytics, or demographics from menu 150. Some analytics are described in more detail below and are just examples of any analytic data that may be downloaded and/or generated by control center 100.

In response to the user selecting UGC analytics from menu 150, analytics engine 136 displays analytics 118 that identify the number of campaign related followers 110, the number of campaign related posted messages 112, and the campaign related sentiment 114. Of course, analytics engine 136 may generate and display any other analytics.

Control center 100 also may identify the top influencers 152 that posted messages related to the campaign. Top influencers 152 may include participants with the largest number of followers, such as celebrities, journalists, experts, etc. Control center 100 also may display highest trending user posts, posts with the largest number of likes, or participants with the largest number of followers. Again, these are just examples of any combination of analytic data may be downloaded, generated, and displayed by analytic system 100. Identifying campaigns and generating analytics for the campaigns is further described in U.S. patent application Ser. No. 15/246,061; filed Aug. 24, 2016, entitled: DYNAMIC CAMPAIGN ANALYTICS VIA HASHTAG DETECTION, which is herein incorporated by reference in its entirety.

Enhanced Notification System

As mentioned above, operators may have trouble detecting critical events in social media 110. For example, after several hours viewing display screen 108, an operator may not notice an event 148A that indicates an increase in the number of posts 112 for the campaign or an event 148B that indicates an increase in the negative sentiment of the campaign. In another example, the operator may not notice an event 148C where a top influencer 152 posted a negative message about the campaign. Control center 100 includes the unique feature of activating enhanced notification device 120 whenever a programmed trigger event 148 is detected in analytics 118.

Media controller 144 may control notification device 120 via a networked wired or wireless connection. As mentioned above, enhanced notification device 120 may include smart lighting or smart audio devices accessed via APIs. As also mentioned above, the smart lighting device can be programmed to generate different light colors, light intensities, light flashing, or light patterns, etc. Similarly, the smart audio device may be programmed to generate any audio level, tone, voice message, stored audio library sound, etc.

In one example, media controller 144 may be programmed to activate a first light 122A, or generate a first audible tone from speaker 124, whenever the number of posts 112 reaches threshold 148A. Management server 144 also may be programmed to activate a second light 122B, or generate a second audible tone from speaker 124, whenever a negative sentiment 114 of posts 112 reaches threshold 148B. Management server 144 also may be programmed to activate a third light 122C, or generate a third audible tone from speaker 124, whenever one of the top influencers 152 posts a negative message 148C.

In another example, media controller 144 may be programmed with multiple trigger events for the same analytic 118. For example, media controller 144 may receive a first lower threshold 148B for sentiment 114 and a second higher threshold 148D for sentiment 114.

Media controller 144 may compare sentiment 114 with the two thresholds 148B and 148D. Media controller 144 may activate a first yellow light 122A, or generate a first tone from speaker 124, if negative sentiment 114 reaches first threshold 148B. Media controller 144 may activate a second red light 122B, or generate a second tone from speaker 124, if sentiment 114 reaches second threshold 148D.

In another example, media controller 114 may increase an intensity of one of lights 122 to indicate an increase in any selectable analytic 118 and decrease the intensity to indicate a decrease in analytic 118.

Media controller 144 also may increase a rate that a sound is generated from speaker 124 to indicate an increase in analytic 118 and decrease the rate of the sound to indicate a decrease in analytic 118. For example, media controller 144 may generate a series of tic noises, similar to the noise made by a geiger counter, that reflects the number of posted messages 112. Media controller 144 may increase the rate of the audio tics in response to an increase in the number of posts 112 and decrease the rate of audio tics in response to a decrease in the number of posts 112.

In another example, media controller 144 may generate a higher, more pleasant, or positive sounding tone from speaker 124 when a particular analytic 118 goes up and generate a lower, less pleasant, or more negative sounding tone when the analytic 118 goes down. For example, media controller 144 may generate a positive sounding ding tone when the number of posts 112 increases and generate a negative buzzer tone when the number of posts 112 decreases.

Any other combination of visual and audio notifications can then be used for any programmable event. For example, media controller 144 may activate enhanced notification device 120 based on any other value, threshold, percentage, rate of change, etc. for any selected analytic 118.

In another example, media controller 144 may detect an initial value or rate of change for one of analytics 118. Media controller 144 then may predict a future value of the analytic 118 based on the initial value or rate. Media controller 144 may be programmed to activate notification device 120 if the predicted future value of analytic 118 is above a programmed threshold. This provides the operator with prenotification of a future potentially important social media event.

Multiple different enhanced notification devices 120 may be located in different locations within a room. Media controller 144 can then be programmed to control different environmental notification attributes in any room location. This moves social media monitoring beyond just the two dimensional display screen 108 to a 3-dimensional space with improved event detection and notification.

Figure 3:
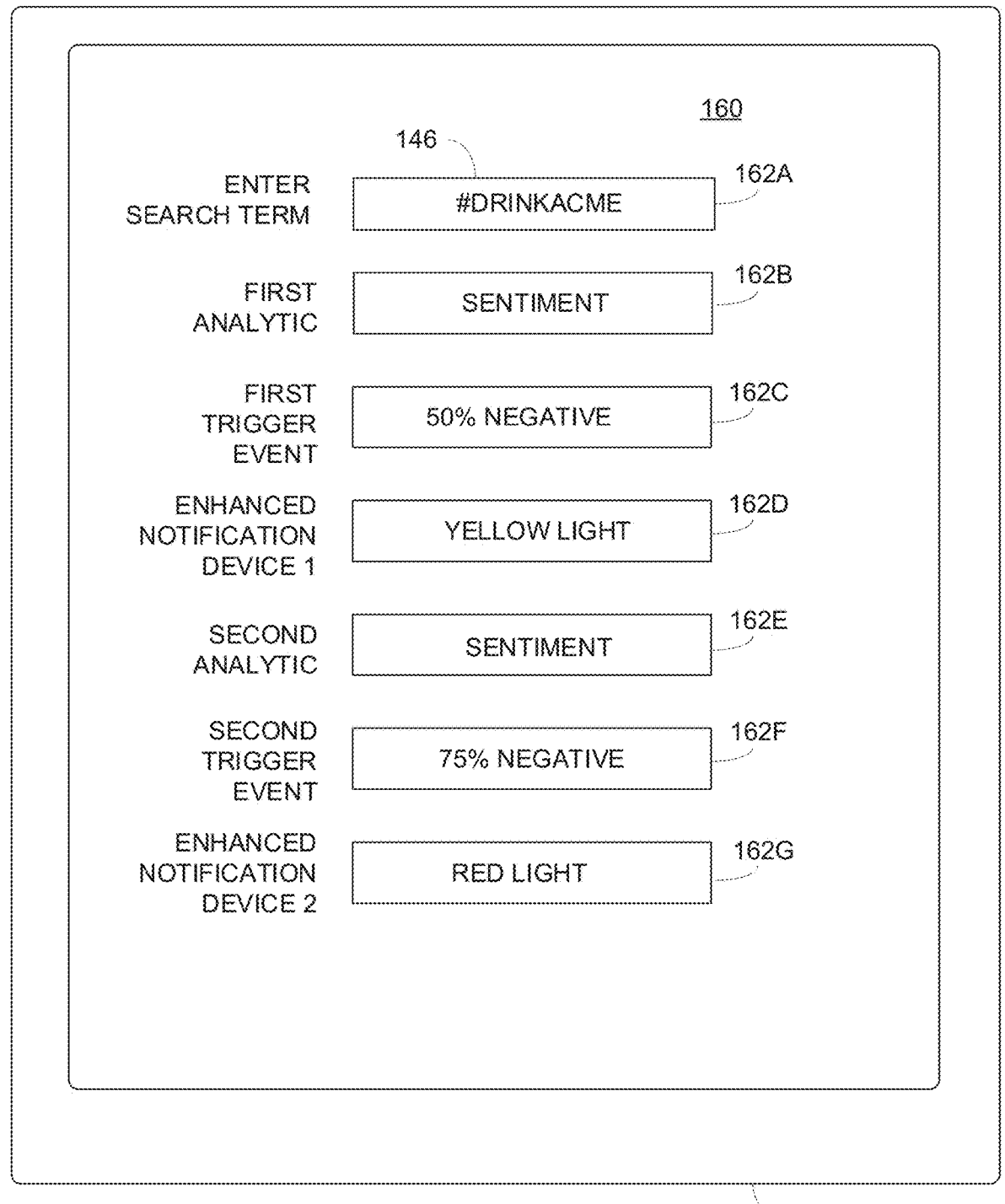
FIG. 3 shows a user interface provided by the real time control center for selecting different event triggers for activating the enhanced notification device.

FIG. 3 shows an example user interface 160 displayed on computer 106. Media controller 144 may display a set of fields or icons 162 on user interface 160 that an operator uses to control notification device 120. For example, user interface 160 may display a search field 162A. As described above, an operator may enter a search term 146 into search field 162A that causes control center 100 to search for different social media and other analytic data associated with search term 146. In this example, search term 146 may be associated with a campaign.

The operator may select a type of social media or analytic in field 162B. For example, the operator may enter a sentiment analytic into field 162B. Control center 100 then calculates and displays the sentiment analytic 114 in a graph as shown FIG. 2.

Field 162C may identify a trigger event for the analytic identified in field 162B. For example, the operator may enter a 50% negative trigger event into field 162C directing the media controller to detect when the sentiment of the campaign messages is more than 50% negative.

The operator may enter a value into field 162D that identifies which enhanced notification device 120 to activate when the trigger event in field 162C is detected. For example, the operator may select a yellow light in field 162D. Media controller 144 is then programmed to activate a yellow light in notification device 120 when the sentiment of the campaign messages is more than 50% negative.

The operator may enter a second type of social media or analytic into field 162E. In one example, the operator may enter the same sentiment analytic previously entered into field 162B. However, any other social media or analytic can be entered into field 162E.

The operator may enter another trigger event into field 162F for the analytic selected in field 162E. In this example, the operator enters a 75% negative trigger event into field 162F directing the media controller to detect when the sentiment of the campaign messages is more than 75% negative.

The operator selects a second notification device 120 in field 162G to activate when the trigger event in field 162F is detected. For example, the operator may enter red light into field 162G directing media controller 144 to activate a red light in notification device 120 when the sentiment of the campaign messages is more than 75% negative.

Control center 100 accesses real-time streaming data associated with the selected search term in field 162A and generates associated sentiment data based on the entries in fields 162B and 162E. Control center 100 activates the yellow light identified in field 162D when a 50% negative sentiment as identified in field 162C is detected. Control center 100 also activates the red light identified in field 162G when a 75% negative as sentiment identified in field 162F is detected.

Figure 4:
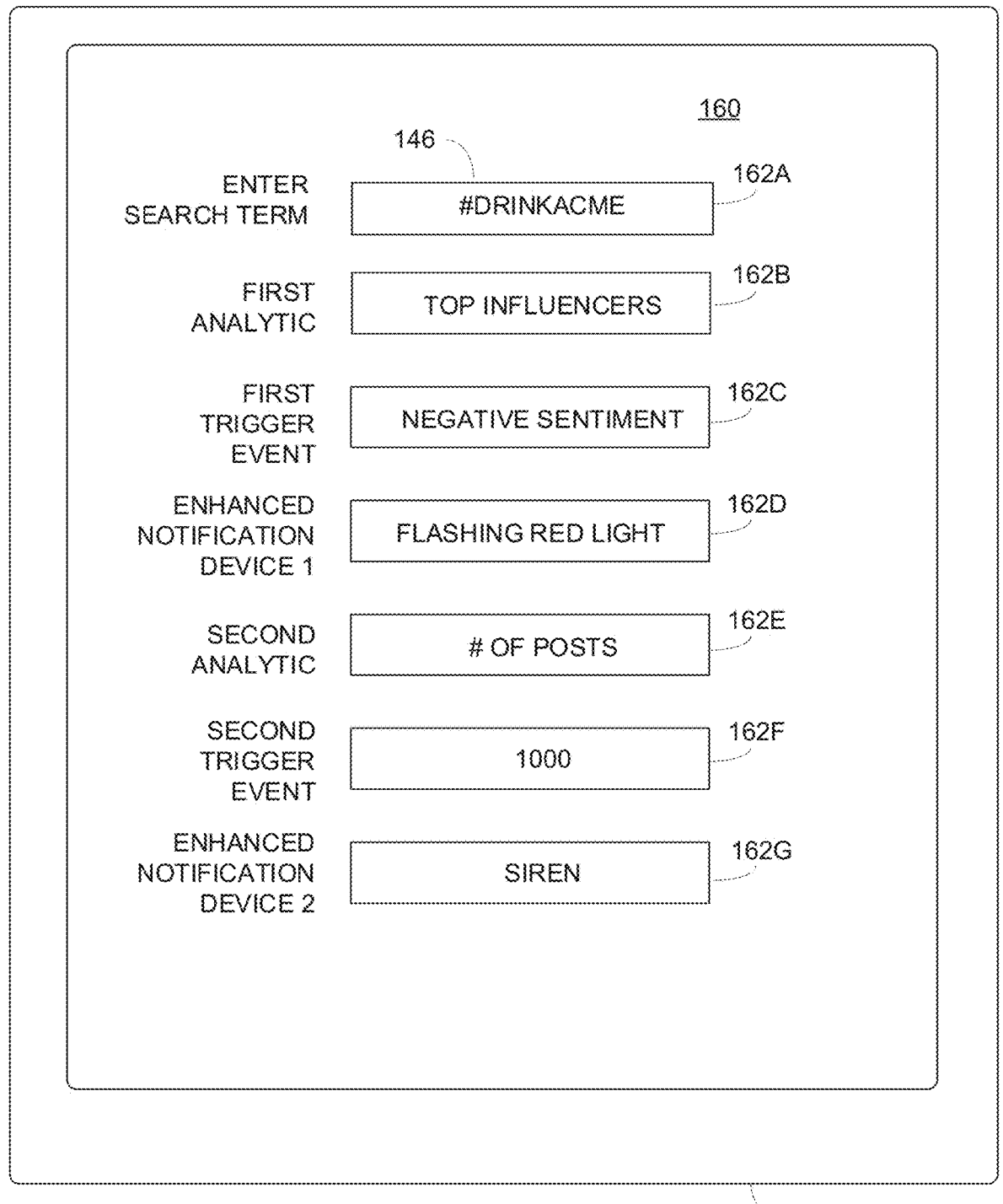
FIG. 4 shows another example of how different event triggers are selected for activating the enhanced notification device.

FIG. 4 shows another example of how an operator can select different analytic trigger events for activating the enhanced notification device. In this example, the same #drinkacme search term 146 is entered into field 162A. This may be the first time search term 146 is entered into user interface 160. Or, the operator may use the previously entered search term 146 and associated data from FIG. 3 and enter different values into any combination of fields 162B-162G.

The operator may enter top influencer analytic into field 162B, a negative sentiment trigger event into field 162C, and a flashing red light into field 162D. Control center 100 identifies the top influencers posting content associated with the #drinkacme campaign based on the analytic selected in field 162B. Control center 100 monitors the messages posted by the top influencers for any negative sentiment based on the trigger event selected in field 162C. Control center 100 then automatically activates a flashing red light in notification device 120 if any top influencers post a message with a negative sentiment.

The operator may enter a second analytic, such as the number of posted messages, into field 162E. The operator may enter a second trigger event, such as 1000 posts, into field 162F. The operator may enter a second notification device, such a siren, into field 162G.

Control center 100 continuously calculates the number of posts associated with the #drinkacme campaign over time based on the analytic selected in field 162E. Control center 100 then activates the siren in notification device 120 whenever 1000 posts are detected.

The first red flashing light notifies the control center operators of a potentially bad event associated with a negative influencer review. The second siren may notify the control center operators of an escalation or second social media activity level, based on the increase in the number of posts. Accordingly, the control center operators can further investigate and/or respond to either trigger event to address any issues in the social media campaign.

Figure 5:
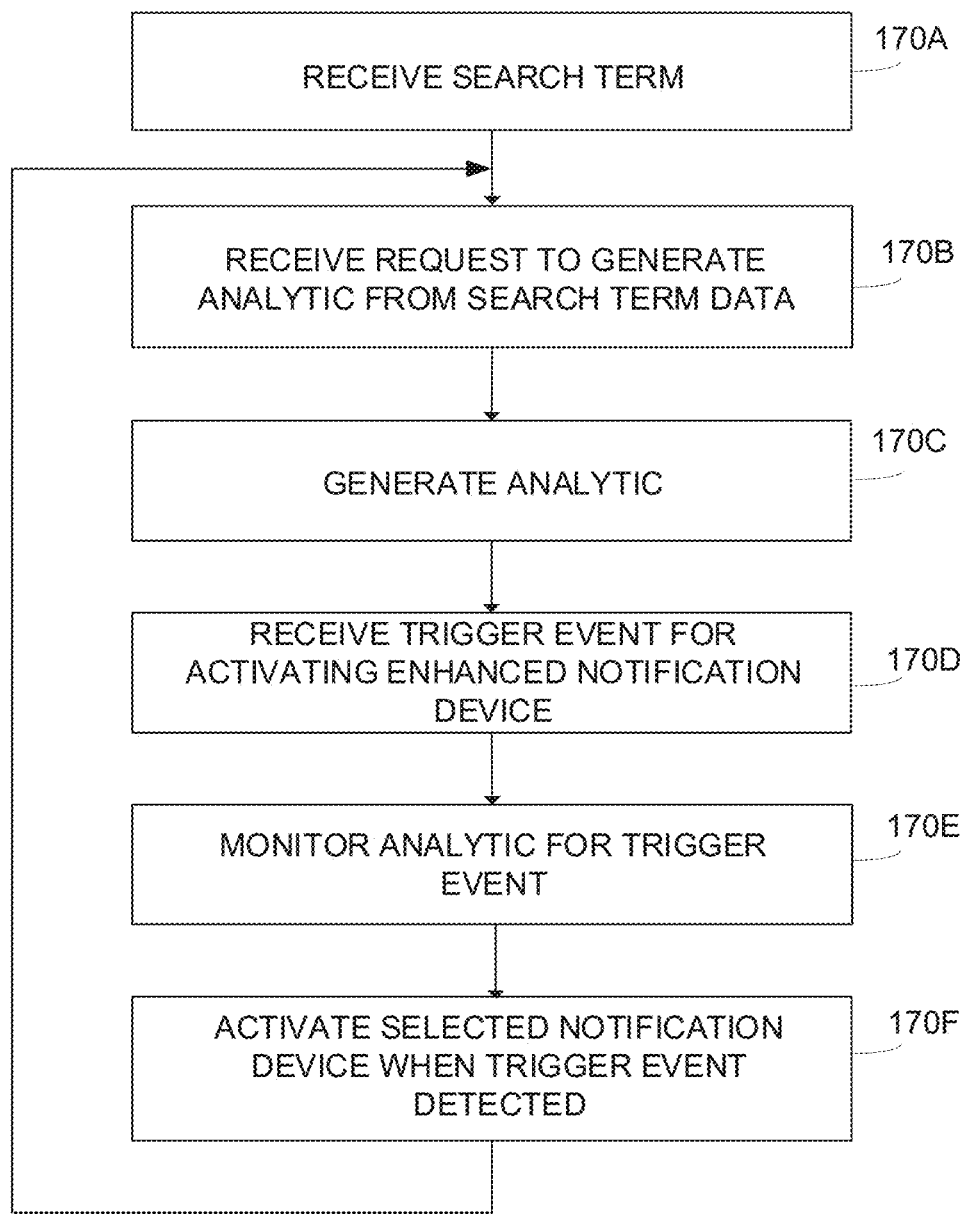
FIG. 5 shows example brand analytics generated by the hashtag analytic system.

FIG. 5 shows in more detail how the control center operates the enhanced notification device. In operation 170A, the control center may receive a search term. In operation 170B, the control center may receive a request to generate a particular analytic from data associated with the search term. As explained above, the control center uses collection servers and an analytics engine to collect social media and other data associated with the search term. If an analytic request is received, the control center in operation 170C uses the analytics engine to generate the requested analytic.

In operation 170D, the control center may receive a trigger event for activating the enhanced notification device. For example, the trigger event may identify a threshold, rate change, percentage, or any other characteristic of the analytic identified in operation 170B. If a trigger event is received, the control center in operation 170E monitors the analytic for the trigger event. If the trigger event is detected, the control center in operation 170F activates the selected notification device. The control center may repeat operations 170B-170F for any other number of selected analytics and associated trigger events.

Hardware and Software

Figure 6:
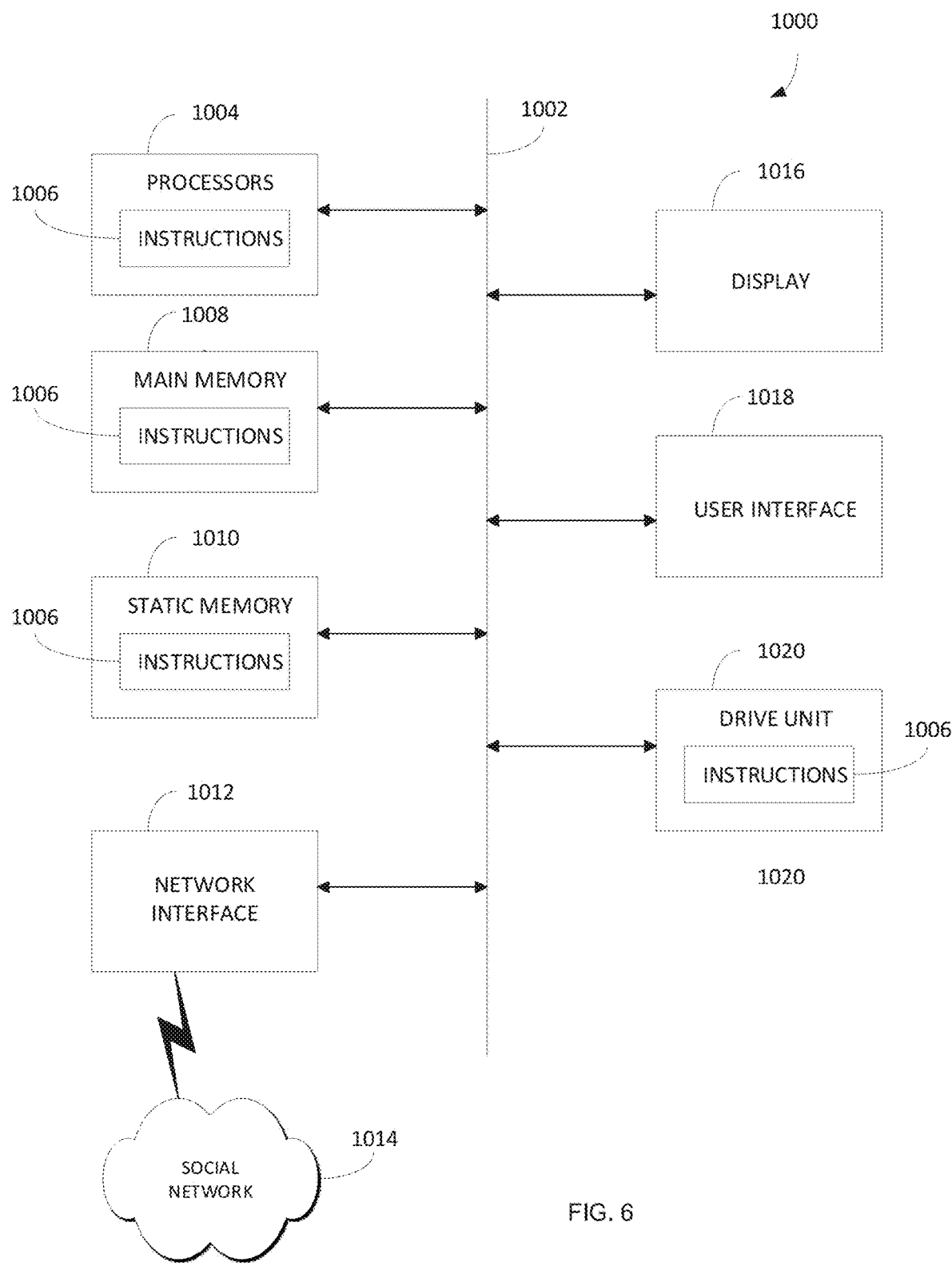
FIG. 6 shows an example computer system used in the control center.

FIG. 6 shows a computing device 1000 that may be used for operating the control center and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A control center to operate in a room occupied by a team of individuals, wherein the individuals occupying the room comprise operators of the control center, the control center comprising:
a first device operable to communicate with one of the individuals occupying the room, the first device including at least one display screen;
a second team notification device operable in a plurality of individually selectable display states for simultaneously notifying the individuals occupying the room, about a selected sentiment analytic;
one or more hardware processors configured to:
receive a selection of a search term from a user interface for the individual member of the team;
receive a selection of the sentiment analytic from the user interface;
receive a trigger event for the sentiment analytic;
use an application program interface to access social media from different networks containing the search term, wherein the social media comprises first original data including real-time streaming data associated with the search term;
generate second new data that is different from the first original data, wherein the second new data includes sentiment information derived from the real-time streaming data associated with the search term, wherein the sentiment information includes the selected sentiment analytic;
display the sentiment analytic on the at least one display screen;
monitor the second new data, including the sentiment information, based on the trigger event; and
automatically and simultaneously notify the individuals occupying the room including activating the second team notification device to indicate a corresponding one of the individually selectable display states, the activating the second team notification device in response to detecting the trigger event in the semantic analytic based on a result of the monitoring the second new data, including the sentiment information.

2. The control center according to claim 1, wherein the second team notification device includes an audio or visual device placed in a different location in the room from the at least one display screen, wherein the one or more hardware processors are configured to continuously display a number of campaign related followers or posted messages on the at least one display screen, wherein the display of the number of campaign related followers or posted messages on the at least one display screen comprises a first environmental attribute in the room and wherein the simultaneous notification uses a second different environmental attribute in the room, wherein the second different environmental attribute does not require continuously viewing the first environmental attribute.

3. The control center according to claim 1, wherein the corresponding one of the individually selectable display states comprises a first display state of the individually selectable display states, wherein the one or more hardware processors are further configured to:
receive an additional trigger event for the sentiment analytic, wherein the monitor the second new data is further based on the additional trigger event; and
automatically and simultaneously notify the individuals occupying the room including activating the second team notification device to indicate a second different display state of the individually selectable display states when the additional trigger event is detected in the sentiment analytic based on a result of the monitoring the second new data.

4. The control center according to claim 1, wherein the one or more hardware processors are further configured to:

automatically increase an intensity of a light in the second team notification device to indicate an increase in the sentiment analytic; and automatically decrease the intensity of the light to indicate a decrease in the sentiment analytic.

5. The control center according to claim 1, wherein the one or more hardware processors are further configured to:
   automatically increase a rate that a sound is generated from the second team notification device to indicate an increase in the sentiment analytic; and
   automatically decrease the rate that the sound is generated from the second team notification device to indicate a decrease in the sentiment analytic.

6. The control center according to claim 1, wherein the one or more hardware processors are further configured to:
   receive a selection of an additional analytic;
   receive a selection of an additional trigger event, the additional trigger event for the additional analytic;
   monitor the additional analytic based on the additional trigger event;
   automatically generate a first tone with the second team notification device when the trigger event is detected in the sentiment analytic based on the result of monitoring the second new data, including the sentiment information; and
   automatically generate a second tone with the second team notification device when the additional trigger event is detected in the additional analytic based on a result of monitoring the additional analytic.

7. The control center according to claim 1, wherein the one or more hardware processors are further configured to:
   receive a selection of an additional analytic;
   receive a selection of an additional trigger event, the additional trigger event for the additional analytic;
   monitor the additional analytic based on the additional trigger event;
   automatically activate a first color light in the second team notification device when the trigger event is detected in the sentiment analytic based on the result of the monitoring the second new data, including the sentiment information; and
   automatically activate a second color light in the second team notification device when the additional trigger event is detected in the additional analytic based on a result of the monitoring the additional analytic based on the additional trigger event.

8. The control center according to claim 1, wherein the trigger event is a value, percentage, or rate of change of the sentiment analytic.

9. The control center according to claim 1, wherein the one or more hardware processors are further configured to:
   identify an initial value or rate of the sentiment analytic;
   predict a future value of the sentiment analytic from the initial value or rate, wherein the sentiment information includes the predicted future value; and
   automatically activate the second team notification device when the trigger event is detected in the predicted future value.

10. A memory having instructions stored thereon for operating a control center, wherein the instructions, when executed by one or more hardware processors, cause the one or more hardware processors to:
    display on a user interface a search field for entering a search term;
    display on the user interface an analytic field for entering an analytic;
    display on the user interface a trigger event field for entering a trigger event for the analytic;
    retrieve social media from different networks containing the search term, wherein the social media comprises first original data including real-time streaming data associated with the search term;
    generate second new data that is different from the first original data, wherein the second new data includes sentiment information derived from the real-time streaming data associated with the search term, wherein the second new data includes the analytic from the social media;
    display the analytic on a control center display screen of a first device associated with an individual member of a team of individuals occupying a room, wherein the individuals comprise operators of the control center;
    monitor the second new data, including the analytic, based on the trigger event;
    automatically identify a display state of a plurality of individually selectable display states of a second team notification device based on the analytic; and
    automatically and simultaneously notify the individuals occupying the room in which the second team notification device is activated to indicate the identified display state when the trigger event is detected in the analytic based on a result of the monitoring the second new data, including the analytic.

11. The memory of claim 10, wherein the second team notification device includes an audio or visual device placed in a different location in the room from the control center display screen, wherein the one or more hardware processors are configured to continuously display a number of campaign related followers or posted messages on the at least one display screen, wherein the display of the number of campaign related followers or posted messages on the at least one display screen comprises a first environmental attribute in the room and wherein the simultaneous notification uses a second different environmental attribute in the room, wherein the second different environmental attribute does not require continuously viewing the first environmental attribute.

12. The memory of claim 10, wherein the corresponding one of the individually selectable display states comprises a first display state of the individually selectable display states, and the instructions are further operable to:
    display on the user interface a second trigger field for entering an additional trigger event for the analytic, wherein monitor the second new data is further based on the additional trigger event;
    automatically and simultaneously notify the individuals occupying the room in which the second team notification device is activated to indicate a second different display state of the individually selectable display states when the additional trigger event is detected in the analytic based on a result of the monitoring the second new data.

13. The memory of claim 10, further comprising instructions operable to:
    automatically increase an intensity of a light in the second team notification device to indicate an increase in the analytic; and
    automatically decrease the intensity of the light in the second team notification device to indicate a decrease in the analytic.

14. The memory of claim 10, further comprising instructions operable to:

automatically increase a rate of a sound generated from the second team notification device to indicate an increase in the analytic; and automatically decrease the rate of the sound generated from the second team notification device to indicate a decrease in the analytic.

15. The memory of claim 10, further comprising instructions operable to:

displaying on the user interface an analytic field for entering an additional analytic;

display a trigger event field for entering an additional trigger event, the additional trigger event for the additional analytic;

monitor the additional analytic based on the additional trigger event;

automatically activate a first audio/visual notification from the second team notification device when the trigger event is detected in the sentiment analytic based on a result of the monitoring the second data, including the sentiment information; and automatically activate a second audio/visual notification from the second team notification device when the additional trigger event is detected in the additional analytic based on a result of the monitoring the additional analytic based on the additional trigger event.

16. The memory of claim 15, wherein:
the first audio/visual notification is a first tone; and
the second audio/visual notification is a second different tone.

17. The memory of claim 15, wherein:
the first audio/visual notification is a first colored light; and
the second audio/visual notification is a second different colored light.

18. The memory of claim 15, wherein the trigger event is a value, percentage, or rate of change of the analytic.

19. The memory of claim 10, further comprising instructions operable to:

identify an initial value or rate of the analytic;

predict a future value of the analytic from the initial value or rate; and automatically activate the second team notification device when the trigger event is detected in the predicted future value of the analytic.

20. The memory of claim 10, wherein the second new data includes sentiment information, and wherein the analytic comprises a sentiment analytic.

* * * * *